(12) United States Patent
Webber

(10) Patent No.: US 7,743,732 B2
(45) Date of Patent: Jun. 29, 2010

(54) BIRD FEEDER WITH ADJUSTABLE SEALING FEEDING PORT

(75) Inventor: Bruce Randall Webber, Wheaton, IL (US)

(73) Assignee: Akerue Industries LLC, Antioch, IL (US)

( * ) Notice: Subject to any disclaimer, the term of this patent is extended or adjusted under 35 U.S.C. 154(b) by 187 days.

(21) Appl. No.: 12/069,368

(22) Filed: Feb. 11, 2008

(65) Prior Publication Data

US 2009/0199777 A1    Aug. 13, 2009

(51) Int. Cl.
*A01K 39/026* (2006.01)
(52) U.S. Cl. ..................................................... 119/77
(58) Field of Classification Search .............. 119/57.8, 119/57.9, 74, 72, 72.5, 76, 77, 78, 52.3, 52.2
See application file for complete search history.

(56) References Cited

U.S. PATENT DOCUMENTS

| 516,600 | A | * | 3/1894 | Higgins | 119/77 |
| 3,016,044 | A | * | 1/1962 | Sollars | 119/80 |
| 4,691,665 | A | * | 9/1987 | Hefner | 119/77 |
| 5,303,674 | A | * | 4/1994 | Hyde, Jr. | 119/77 |
| 5,493,999 | A | * | 2/1996 | Schenck | 119/72 |
| 5,655,477 | A | * | 8/1997 | Hoffman et al. | 119/52.2 |
| 5,682,835 | A | * | 11/1997 | Walter et al. | 119/57.8 |
| D542,479 | S | * | 5/2007 | O'Dell | D30/124 |
| 2008/0257273 | A1 | * | 10/2008 | Carter et al. | 119/72 |
| 2009/0031962 | A1 | * | 2/2009 | Webber | 119/57.9 |

* cited by examiner

*Primary Examiner*—Rob Swiatek
*Assistant Examiner*—Ebony Evans
(74) *Attorney, Agent, or Firm*—Justin Lampel

(57) ABSTRACT

The present invention generally relates to a bird feeder having an adjustable sealing feeding port. The feeding port may be moved from a first position to a second position with respect to the rest of the feeder. More specifically, the bird food may be secured within the bird feeder when the adjustable sealing feeding port is in the second position and the bird food may be accessible to birds while the adjustable sealing feeding port is the first position. The adjustable sealing feeding port may have a stopper made from, for example, plastic or rubber which may create a liquid tight seal with the body of the bird feeder.

8 Claims, 3 Drawing Sheets

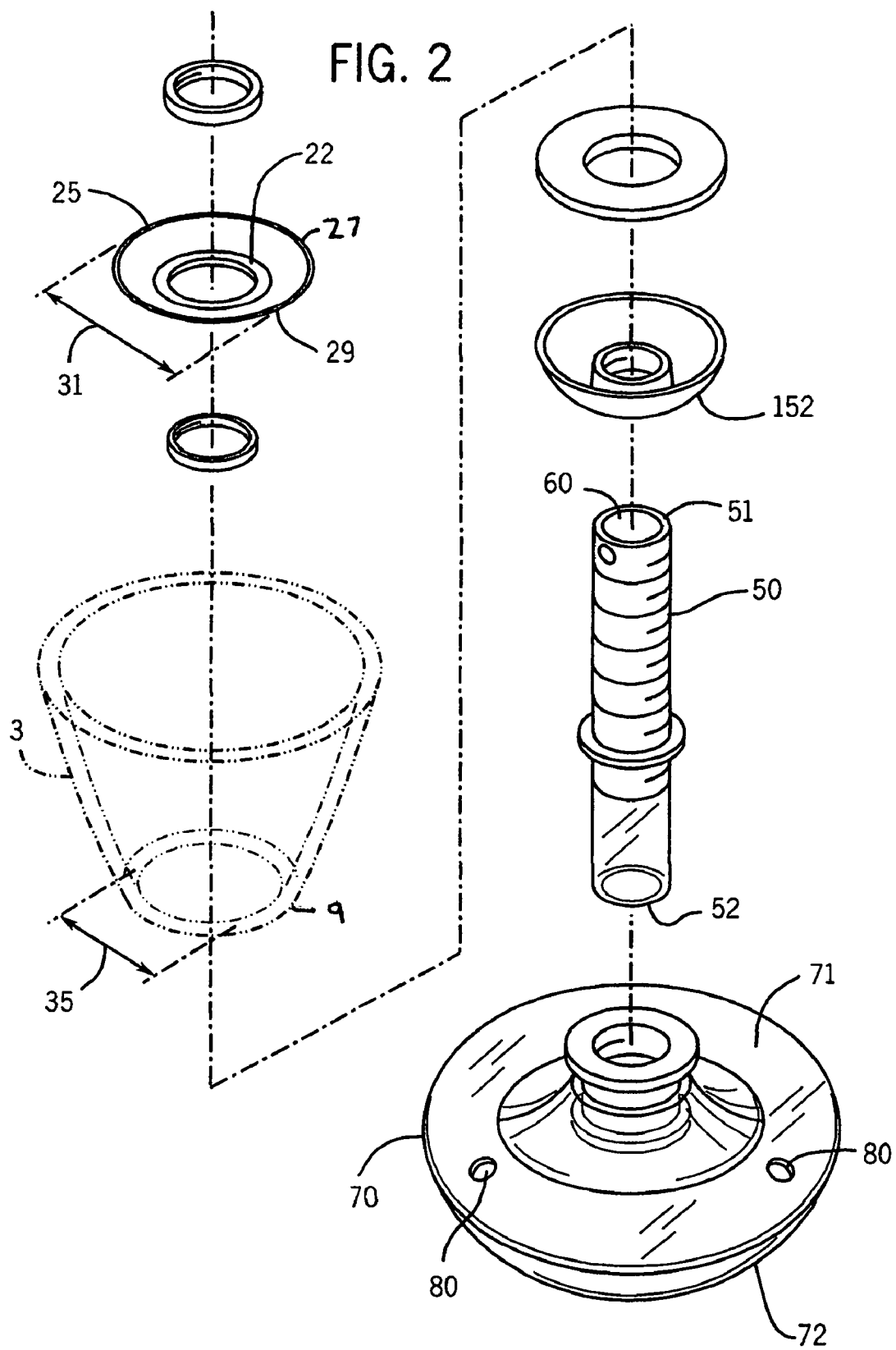

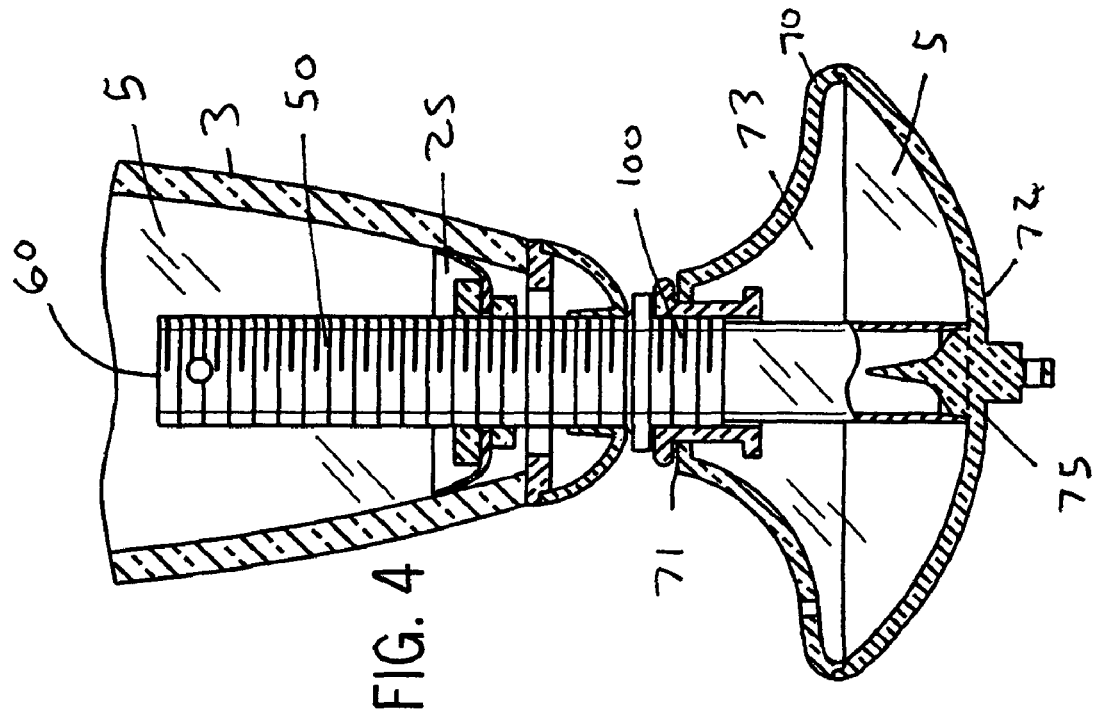
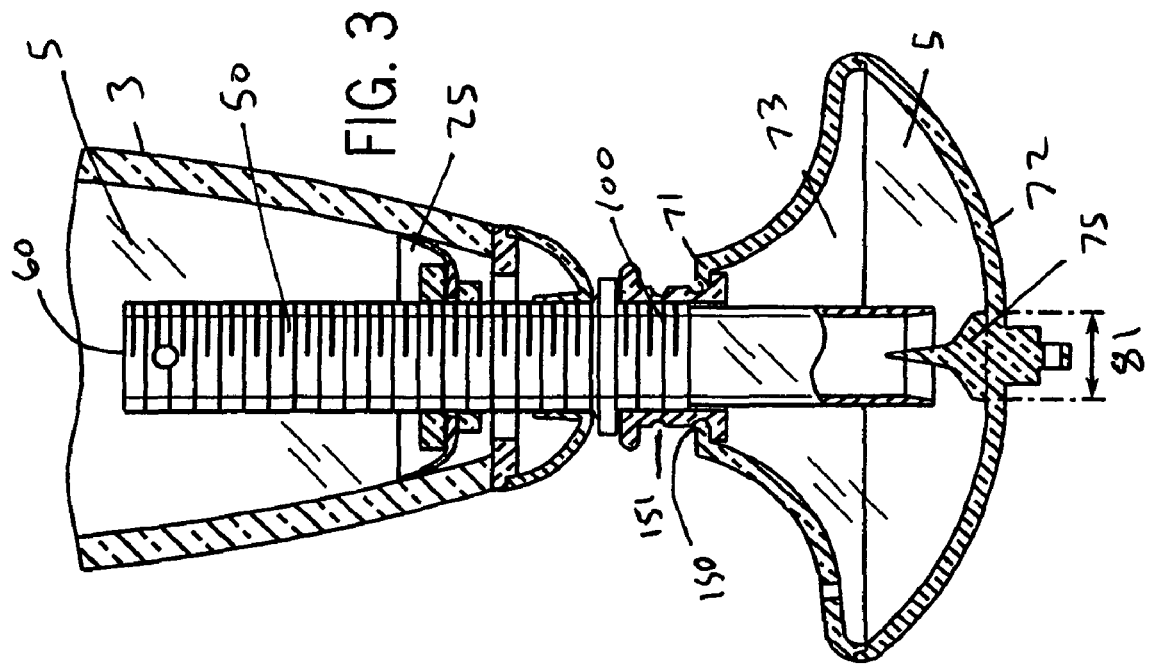

BIRD FEEDER WITH ADJUSTABLE SEALING FEEDING PORT

BACKGROUND OF THE INVENTION

The present invention generally relates to a bird feeder having an adjustable sealing feeding port. The feeding port may be moved from a first position to a second position with respect to the rest of the feeder. More specifically, the bird food may be secured within the bird feeder when the adjustable sealing feeding port is in the second position and the bird food may be accessible to birds while the adjustable sealing feeding port is the first position. The adjustable sealing feeding port may have a stopper made from, for example, rubber or plastic which may create a liquid tight seal with the body of the bird feeder.

Inverted containers which are used to feed birds or other animals are commonly known. For example, U.S. Pat. No. 5,303,674 to Hyde, Jr. discloses a multi-component hummingbird feeder which can be completely disassembled. The hummingbird feeder has a liquid reservoir comprised of a cup-shaped bottom and a dome-shaped top. A hollow neck protrudes vertically from the bottom and through a central aperture in the top. A collar is seated on the top and surrounds the portion of the neck which extends above the top. A head which is adapted to coact with the collar is placed in the upper end of the neck and tightened until the top and bottom elements are in a tight sealing interengagement. Located in the top are feeding ports to provide access to a liquid food supply in the reservoir.

U.S. Pat. No. 3,589,338 to Lovitz discloses a holder for bottle and tube pet feeders which have a bottom feed pipe and which are adapted for suspension in an inverted position within a pet housing. A wire bracket comprising two parallel upright sections with top hooks supports two forwardly positioned vertically aligned loops, the upper and larger loop being adapted for engagement with the body of the bottle or tube feeder, the lower loop being adapted for underlying supporting engagement with the feeder and in embracing engagement with the feed pipe, whereby the feeder and feed pipe are maintained against displacement.

U.S. Pat. No. 3,990,403 to Jacobs discloses an inverted ceramic container which dispenses nutritional liquids through a short glass tube to hovering hummingbirds. The tube extends into the interior of the dispenser through a resilient stopper which engages a refill aperture in the dispenser. Various insulative properties of the ceramic dispenser protect the liquids from heat and light damage and loss. The rough unglazed inside surface of the dispenser neck establishes a tenacious seal with the resilient stopper. The unglazed exterior surface of the neck prevents dew and rain moisture from flowing down the outside surface of the dispenser to the tip of the glass tube. This surface moisture is objectionable because it wets the tip of the glass tube causing the nutritional liquid to drip out. The plastic nature of moist unfired clay readily permits the formation support loop integral with the ceramic body.

A common problem with these containers, especially hummingbird bird feeders, is that the nectar placed in the bird feeder tends to leak out of the container. Further, it is often difficult to fill and then invert the containers without the nectar leaking out of the container. Even further, these containers fail to provide the features of the present invention. More specifically, these existing containers do not disclose a bird feeder which can be easily cleaned, refilled and inverted without nectar leaking from the container. A need, therefore, exists for an improved bird feeder which has the features of the present invention.

SUMMARY OF THE INVENTION

The present invention generally relates to a bird feeder having an adjustable sealing feeding port. The feeding port may be moved from a first position to a second position with respect to the rest of the feeder. More specifically, the bird food may be secured within the bird feeder when the adjustable sealing feeding port is in the second position and the bird food may be accessible to birds while the adjustable sealing feeding port is the first position. The adjustable sealing feeding port may have a stopper made from, for example, plastic or rubber which may create a liquid tight seal with the body of the bird feeder.

An advantage of the present invention is to provide a bird feeder which prevents nectar or other food from leaking from the feeder during the filling and hanging of the feeder.

An advantage of the present invention is to provide a bird feeder which prevents nectar or other food from leaking from the feeder while hanging as a result of gravity or changes in temperature.

An advantage of the present invention is to provide a bird feeder which may be easily cleaned and refilled.

A further advantage of the present invention is to provide a bird feeder which is opaque or tinted to prevent sunlight from damaging nectar placed within the bird feeder.

For a more complete understanding of the above listed features and advantages of the present bird feeder, reference should be made to the following detailed description of the preferred embodiments and to the accompanying drawings. Further, additional features and advantages of the present invention are described in, and will be apparent from, the detailed description of the preferred embodiments and from the drawings.

BRIEF DESCRIPTION OF THE DRAWINGS

FIG. 2 illustrates an exploded view of the feeding port of the bird feeder.

FIG. 3 illustrates a side view of the feeding port of the present invention wherein the feeding port is in a first or open position.

FIG. 4 illustrates a side view of the feeding port of the present invention wherein the feeding port is in a second or closed position.

DETAILED DESCRIPTION OF THE PREFERRED EMBODIMENTS

Figure 1:
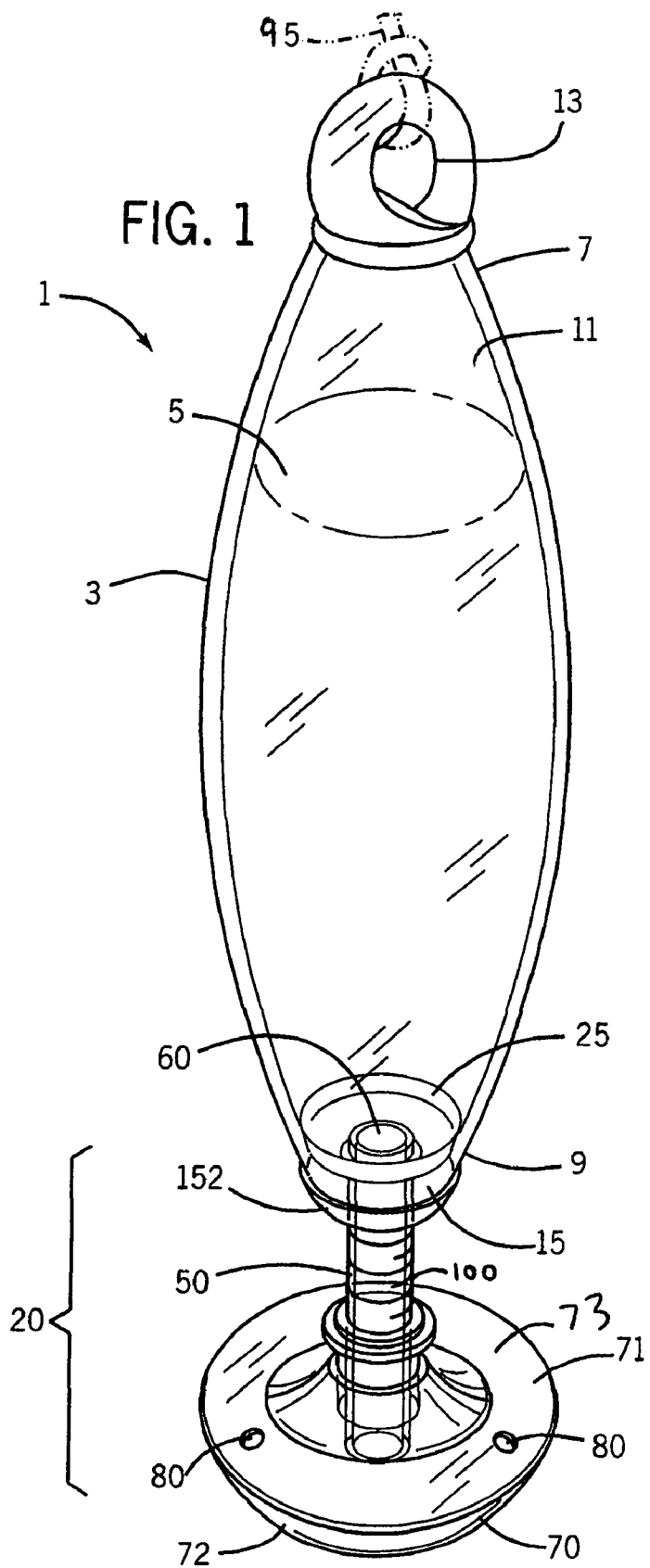
FIG. 1 illustrates a perspective view of the bird feeder of the present invention.

The present invention generally relates to a bird feeder having an adjustable sealing feeding port. The feeding port may be moved from a first position to a second position with respect to the rest of the feeder. More specifically, the bird food may be secured within the bird feeder when the adjustable sealing feeding port is in the second position and the bird food may be accessible to birds while the adjustable sealing feeding port is the first position. The adjustable sealing feeding port may have a stopper made from, for example, plastic or rubber which may create a liquid tight seal with the body of the bird feeder.

Referring now to the drawings wherein like numerals refer to like parts, FIG. 1 generally illustrates a bird feeder 1 having a body 3 for holding bird food 5. The body 3 of the bird feeder 1 holds the bird food 5, which may be a liquid to be dispensed. The liquid may be, for example, nectar, sugar water or any other desirable food source. The bird feeder 1 is especially suitable for holding a liquid, such as, nectar, which is particularly useful in attracting humming birds.

Bird feeders 1 are commonly hung outside near a patio or garden. Small increases in the outside air temperature may cause the temperature of the bird food 5 (usually nectar) located within the bird feeder 1 to increase exponentially. As a result, the bird food 5 may spoil or begin fermentation. Further, as the outside air temperature increases air bubbles and pressure may begin to form in the bird food 5 source forcing leakage of the bird food 5 out of the bird feeder 1. Therefore, the body 3 of the bird feeder 1 is preferably tinted or opaque to prevent sunlight damage to the bird food 1. Further, the body 3 of the bird feeder 1 may be colored so as to attract or repel certain birds.

The bird feeder 1 may be constructed from, for example, glass, plastic or any other suitable material. Further, the bird feeder 1 may be scented so as to attract a certain type of bird or animal or to repel a certain type of bird and/or other animal. Preferably, the bird feeder 1 is constructed from a material that can be easily cleaned and that is strong and sturdy enough to resist most outdoor weather conditions. The bird feeder 1 illustrated in FIG. 1 is generally cylindrical, however, the bird feeder 1 may be formed in any suitable shape.

As stated above, the bird feeder 1 may have a body 3 having a top end 7, a bottom end 9 and an interior 11. The bird food 5 may be placed within the interior 11 of the bird feeder 1. The top end 7 of the bird feeder 1 may have a loop or hook 13 for hanging the bird feeder 1 on a string 95 or the like. The top end 7 of the bird feeder 1 may lack an opening and may be completely sealed.

The bottom end 9 of the bird feeder 1 may have an opening 15. The opening 15 may be generally circular in shape. The opening 15 may be at least partly covered by a bottom plate 152 and a shaft 50 as discussed below.

An adjustable sealing feeding port 20 may be at least partly located within the opening 15 of the bottom end 9 of the bird feeder 1. The adjustable sealing feeding port 20 may have a stopper 25, which is preferably made from rubber or plastic. The rubber stopper 25 may have a top end 27, a bottom end 29 and a diameter 31 (FIG. 2). It should be noted that although the figures illustrate a circular rubber stopper 25 a rubber stopper 25 of any shape may be used to correspond with any shape bird feeder 1. The diameter 31 of the rubber stopper 25 may be slightly larger than a diameter 35 near the bottom end 9 of the bird feeder 1 such that the rubber stopper 25 is in contact with the interior wall of the bird feeder 1.

Permanently attached to the bottom end 9 of the bird feeder 1 may be a bottom plate 152 of the adjustable sealing feeding port 20. More specifically, the bottom plate 152 may be, for example, generally circular and may cover the opening 15 at the bottom end 9 of the bird feeder 1. The bottom plate 152 may have an opening through which a shaft 50 vertically extends. The bottom plate 152 may permanently surround the shaft 50 and the bottom plate 152 and the shaft 50 may be permanently located at the bottom end 9 of the bird feeder 1 such that liquid may not pass through the opening 15 at the bottom end of the bird feeder 1 without passing through the shaft 50.

Above the bottom plate 152 and also surrounding the shaft 50 may be a rubber stopper 25. More specifically, the rubber stopper 25 may be located within the body 3 of the bird feeder 1 while the bottom plate 152 may be located outside the body 3 of the bird feeder 1 and secured to the bottom end 9 of the bird feeder 1. As a result, the rubber stopper 25 may help prevent the shaft 50 from accidentally being removed from the body 3 while the bottom plate 152 may help prevent the shaft 50 from accidentally sliding into the body 3 of the bird feeder 1. As a result, the bottom plate 152, the shaft 50 and the rubber stopper 25 may all be permanently secured partly to the bottom end 9 of the bird feeder 1.

The shaft 50 may extend through an opening in the rubber stopper 25, through the bottom end 15 of the body 3 and through an opening in the bottom plate 152. The bottom end 29 of the rubber stopper 25 may be secured to a shaft 50 having a first end 51 and a second end 52. The shaft 50 may extend vertically through the opening 15 of the bottom end 9 of the bird feeder 1. Further, the shaft 50 may have an opening 60 at the first end 51 and the second end 52 which allows the bird food 5 to pass completely through the shaft 50. In an embodiment the exterior of the shaft 50 is threaded and may be twisted similar to that of a screw. Alternatively, the shaft 50 may simply be smooth. As stated above, the shaft 50 may pass through an opening in a bottom plate 152 located at the bottom end 9 of the bird feeder 1. When secured onto the bottom end 9 of the bird feeder 1, the bottom plate 152 may prevent the bird food 5 from exiting the interior 11 of the body 3 of the bird feeder 1 (except through the shaft 50).

The bottom end 52 of the shaft 50 may be secured to a secondary holding container 70 by, for example, a threaded portion 100 on the shaft 50 which corresponds to a threaded portion on the secondary holding container 70. The secondary holding container 70 may have a top end 71, a bottom end 72 and an interior 73. The bird food 5 may flow from the interior 11 of the body 3 of the bird feeder 1, through the opening 60 in the shaft 50, into the interior 73 of the secondary holding container 70 by, for example, gravity. The bottom end 72 of the secondary holding container 70 may have a plug 75 at least partly located within the interior 73. The plug 75 may be, for example, in the shape of a cone. The plug 75 of the secondary holding container 70 is preferably made from rubber or plastic; however, the plug 75 may be made from any suitable material. Further, the plug 75 of the secondary holding container 70 may have a diameter 81 which is at least as large as the opening 60 of the shaft 50. As a result, while the plug 75 is inserted into the opening 60 at the bottom end 52 of the shaft 50 bird food 5 may be prevented from passing through the shaft 50 and into the interior 73 of the secondary holding container 70.

A plurality of openings 80 may be located near the top end 71 of the secondary holding container 70. The plurality of openings 80 may allow a bird to access the food 5 within the interior 73 of the secondary holding container 70 when food 5 is present.

Referring now to FIGS. 3 and 4, the shaft 50 may have threaded members 100 whereby the secondary holding container 70 may be rotated with respect to the bottom end 9 of the bird feeder 1. When filling the interior 11 of the bird feeder 1 the user first inverts the bird feeder 1 into the upside down position so that the bottom end 9 of the bird feeder 1 is facing upward. The user may then remove the secondary holding container 70 from the shaft 50 to obtain access to the opening 60 of the shaft 50. Bird food 5 may then be inserted into the opening 60 of the shaft 50 and into the interior 11 of the body 3 of the bird feeder 1.

The user simply unscrews (or unsnaps) and completely removes the secondary holding container 70 from the shaft 50 and refills the interior 11 of the bird feeder 1 through the opening 60 in the bottom end 52 of the shaft 50. When the bird feeder 1 is filled, the user screws (or snaps) the secondary holding container 70 back onto the shaft 50. The user may then move the secondary holding container 70 back and forth between the first position A and the second position B. The user may then invert the bird feeder 1 again into the useful position without the bird food 5 leaking out of the secondary holding container 70 or the opening 15 of the bottom end 9, as is common in the use of many other type bird feeders.

The secondary holding container 70 may have a cylindrical portion having corresponding threaded 100 members which engage with the threaded members of the shaft 50. Alternatively, the shaft 50 may lack the threaded members 100 and the bird feeder 1 may simply snap and lock into a first position A (FIG. 3) or a second position B (FIG. 4). Tabs 150 on the secondary holding container 70 may lock into notches 151 located on a device located on the shaft 50. Alternatively, the shaft 50 may simply have notches 151 for securing the secondary holding container 70. The tabs 150 may remain secure within the notches 151 by, for example, friction. A user may pull or push on the secondary holding container 70 to overcome the friction and move the secondary holding container 70 into or out of the first position A or second position B with respect to the shaft 50 and body 3 of the bird feeder 1.

After the bird feeder 1 is in the correct position, the user pulls on the secondary holding container 70 to move the secondary holding container 70 from the second position B into the useful first position A. In this second position A the plug 75 is no longer in contact with the shaft 50 and the bird food 5 may flow down the opening 60 of the hollow shaft 50 and into the secondary holding container 70. Air pressure may stop the bird food 5 from overflowing out of the plurality of openings 80 on the secondary holding container 70. As a result, the secondary holding container 70 remains partially full as long as there is bird food 5 in the interior 11 of the bird feeder 1. With bird food 5 in the secondary holding container 70 birds may access the bird food 5 in the secondary holding container 70 by way of the plurality of the openings 80 on the top surface of the secondary holding container 70.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A bird feeder comprising:
   a first container having a top side, a bottom side and an interior wherein liquid may be stored in the interior of the first container;
   an opening at the bottom of the first container;
   a secondary container having a top side and a bottom side and an interior wherein the secondary container is located near the bottom of the first container wherein the secondary container has an opening at the top side;
   a shaft in the form of a non-tapering tube having an upper opening spaced above said opening of the first container and the upper end spaced from the interior wall of said first container and having a bottom opening wherein the shaft extends from the interior of the first container out through the bottom of the first container wherein the shaft has a hollow interior which may allow the liquid to pass from the interior of the first container into the interior of the secondary container and wherein the secondary container moves vertically along the shaft with respect to the first container from a first position to a second position wherein the first position allows the flow of liquid from the first container through the shaft into the secondary container and wherein the second position prohibits the flow of the liquid from the first container to the secondary container; and
   a stationary plug located within the secondary container wherein the stationary plug moves vertically with respect to the first container while remaining stationary with respect to the secondary container and wherein the stationary plug substantially covers the bottom opening of the hollow shaft creating a liquid-tight seal while the secondary container is in the second position thereby preventing the liquid from the interior of the first container from entering the interior of the secondary container through the shaft.

2. The bird feeder of claim 1 further comprising:
   a plurality of openings located on the top side of the secondary container wherein a bird may access the liquid located within the interior of the secondary container through the plurality of openings.

3. The bird feeder of claim 1 further comprising:
   a tab located on the secondary container wherein the tab locks into a corresponding notch located on the shaft.

4. The bird feeder of claim 1 further comprising: a stopper located within the first container and around the shaft wherein the stopper prevents the liquid within the interior of the first container from exiting the first container anywhere other than through the shaft.

5. The bird feeder of claim 1 wherein gravity forces the flow of liquid from the first container to the second container.

6. The bird feeder of claim 1 wherein liquid may be added into the interior of the first container through the shaft.

7. The bird feeder of claim 1 wherein the first container is opaque.

8. The bird feeder of claim 1 wherein the second container is opaque.

* * * * *